July 20, 1943.　　　　C. G. JOA　　　　2,324,930

STACKING AND BOXING APPARATUS

Filed Aug. 2, 1940

INVENTOR
CURT G. JOA.
BY
Wheeler, Wheeler & Wheeler
ATTORNEYS

Patented July 20, 1943

2,324,930

UNITED STATES PATENT OFFICE 2,324,930

STACKING AND BOXING APPARATUS

Curt G. Joa, Sheboygan Falls, Wis., assignor to Curt G. Joa, Inc., Sheboygan Falls, Wis., a corporation of Wisconsin Application August 2, 1940, Serial No. 349,623

19 Claims. (Cl. 226—14)

This invention relates to improvements in apparatus adapted to receive articles from a conveyor belt and to stack and box said articles for shipment and use.

While the device finds particular adaptability in the manufacture of sanitary napkins, the invention may be employed to stack and box various other finished articles such as are commonly delivered along a conventional lug carrying conveyor chain.

Important objects of my invention are to so combine article feeding means, stacking means, stack receiving and outfeeding means, and boxing means, as to enable these operations to be continuously performed in a regular order of succession; to provide for mechanically placing articles in widely spaced relation to each other on an infeeding table having an associated conveyor adapted to deliver them successively to a stacking conveyor capable of placing a definite number of articles in superposed relation for simultaneous stacking upon an outfeeding table and an associated conveyor, which carries the stacks to a continuously moving boxing conveyor; to provide a boxing conveyor capable of delivering each stack into a receiving box for packaging, while maintaining the stack in an upright position, and withdrawing the propelling means away from the stack to an inoperative position pending its return to the receiving end of the boxing conveyor; and to provide stack outfeeding and boxing conveyors with stack pushing arms which automatically retract after each pushing operation, each conveyor being provided with special means for restoring the pusher arms to operative position preparatory to movement of another stack.

A further object of the invention is to provide an improved stacker and boxer which may be manufactured at a low cost and maintained with a minimum cost of upkeep.

Other objects and advantages of the invention will become apparent to those skilled in the art upon an examination of the drawing, specification and claims appended thereto.

In the drawing.

Like parts are identified by the same reference characters throughout the several views.

Figure 1:
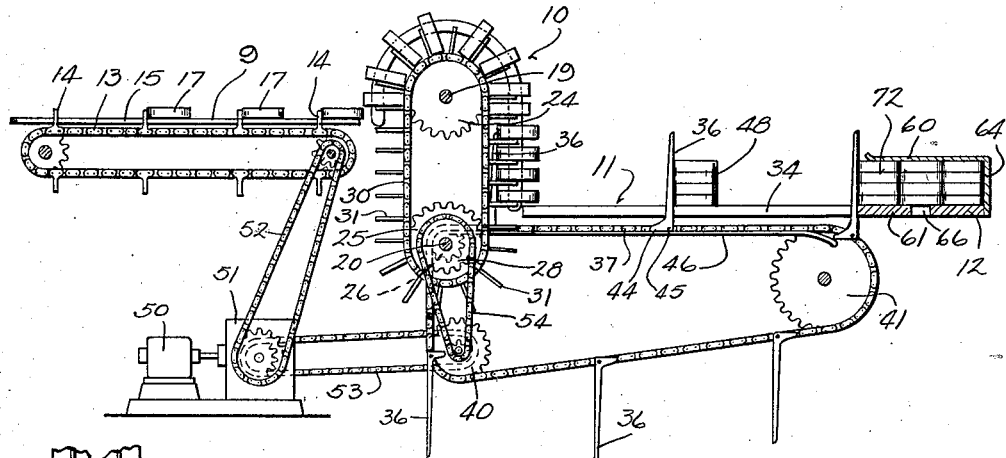
Figure 1 is a side elevation, partly in section, of the improved stacker and boxer mechanism.

Referring to Figure 1, the device includes generally an article infeeding table generally designated at 9, an endless chain type stacker 10, a stack receiving table 11, and a boxer 12.

Figure 2:
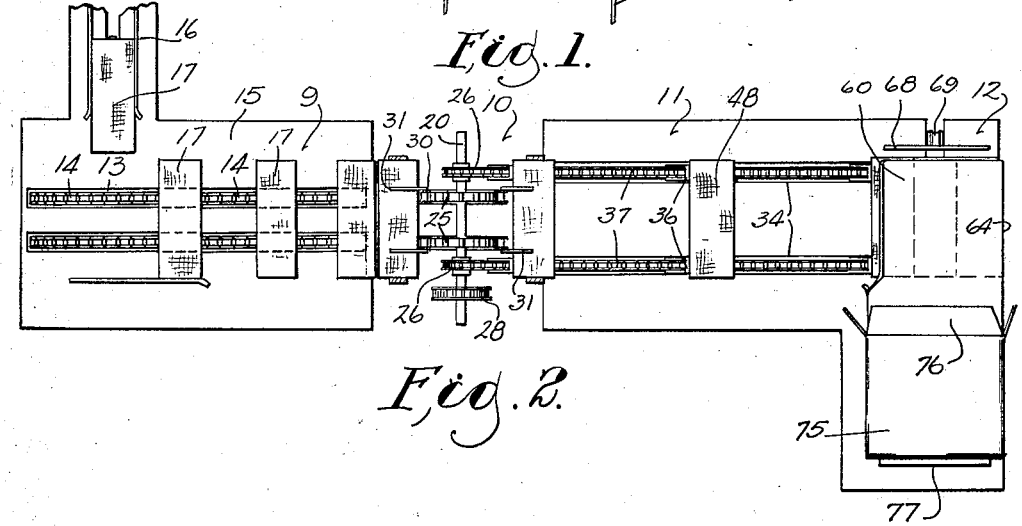
Figure 2 is a plan view of the device shown in Figure 1.

An infeeding conveyor, preferably including a pair of conveyor chains 13 carrying lugs 14, operates along an infeeding table 15 to successively place the finished articles 17 in the stacker 10. Articles may be assembled on one or more assembly conveyors 16 and fed to the delivery table at an angle thereto, as shown in Figure 2. The infeeding table and conveyor mechanism may be of any conventional type. That part of the mechanism forms no part of my present invention other than it must be synchronized with the stacker mechanism.

The stacker mechanism includes a pair of horizontally disposed shafts 19 and 20 supported by a suitable frame, not shown. Shafts 19 and 20 each carries a pair of spaced sprockets 24 and 25, respectively, which are keyed for rotation therewith. The lower shaft 20 carries a pair of smaller sprockets 26 spaced outwardly from sprockets 25 and a driving sprocket 28. A pair of endless chains 30 operate between pairs of sprockets 24 and 25, as best shown in Figure 1. Chains 30 are provided with a multiplicity of outwardly projecting equally spaced supporting arms 31 to provide article transfer means from feed table 9 to stacker table 11.

A second pair of conveyor chains 37 are synchronized with the stacker conveyor chains 30 through sprockets 26 with which they are enmeshed, by reason of sprockets 25 and 26 being keyed for rotation with a common shaft 20. Chains 37 operate over sprockets 40 and 41 as well as sprockets 26, that portion of chain between sprockets 26 and 41 being parallel to and spaced below table 11. These chains are aligned with a pair of elongated slots 34 provided longitudinally in table 11 and extending from the stacker end thereof to a point adjacent the boxer 12. Chains 37 carry aligned pairs of paddles or pusher arms 36 which vertically project through slots 34 and extend substantially above table 11 as they travel between sprockets 26 and 41, as hereinafter more fully described.

During operation of the device, articles are fed along table 9 by conveyor lugs 14 to deliver finished articles 17 intermediate successive pairs of arms 31 and into abutting relation with chains 30. Arms 31 are carried by chains 30 in a clockwise direction as viewed in Figure 1, hence the articles move upwardly and then through an arcuate path to the descending side or run of the stacker conveyor. When a series of articles reach the position shown in Figure 1, an aligned pair of paddles 36, travelling toward boxer 12 on chains 37, laterally sweep a plurality of the bottom-most articles (four being illustrated) to remove them from arms 31. Upon their removal by the paddles, the articles fall in a stack 48 in which form they are conveyed by the outfeeding chains 37 along table 11 toward boxer 12. The device is so synchronized and the pusher arms 36 are so spaced that this operation will be repeated when the stacking conveyor has brought a sufficient number of articles into stack forming position, as shown in Figure 1. Article stacks 48 are forced into the boxer housing hereinafter described by the delivery of subsequent stacks along table 11 until said housing is filled, as shown in Figure 1.

Conveyor chains 13, 30 and 37, as well as a boxer chain 69 hereinafter described, are driven from a common source of power such as a motor 50 as illustrated in Figure 1, which feeds into a reduction unit 51. Chain 52 drives feed conveyor 13, while chains 53 and 54 drive the stacker conveyors through suitable reduction apparatus to effect proper speed and synchronization. The drive from the reduction unit 51 to the stacker conveyor is not shown, but it is apparent that any suitable drive means may be employed to effect a proper speed and synchronization with the other conveyors.

A pair of fixed guide members 46 are provided to extend in closely spaced parallel relation below chains 37 and extending substantially between sprockets 20 and sprockets 41. The function of these guide members is to maintain paired paddles 36 in an upright position during their travel from sprockets 26 to boxer 12, or until the stack of articles propelled thereby is disposed within a boxer housing 60, at which time the paddles tilt or fold in respect to chains 37 to allow their passage between the boxer base or table 61 and sprockets 41. To effect rigidity of the paddles in respect to the chain and to maintain them in an upright position during this portion of travel, they are provided with bifurcated offset base portions 44, for tiltable mounting on chains 37 by means of pintles 45, the bifurcated portions straddling the chains. While the paddles travel along the path of guides 46, their base portions 44 ride along the upper surface of the guide members to prevent tilting in a counter-clockwise direction as viewed in Figure 1, tilting in a clockwise direction being prevented by the weight of the stacked articles being conveyed thereby. When the paddles reach the point at which the article stack carried thereby is disposed within the boxer 12, at which point the guide member 46 terminates, contact between the upper portion of the paddles and the base 61 of the boxer forces them to tilt and chains 37 draw them in tilted position through the opening between boxer base 61 and the end of guide member 46. During their travel from sprockets 41 over sprockets 40 and back to sprockets 26, gravity pulls the paddles downwardly, but as they pass sprockets 26, offset portions 44 again contact guide members 46 to force them into a vertical position prior to contact with another stack of articles, and hence the cycle is repeated.

Figure 3:
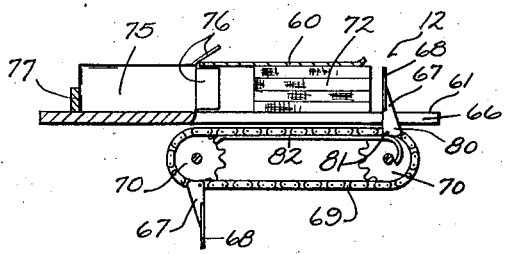
Figures 3 is a right-hand end elevation of the device shown in Figures 1 and 2.

Boxer unit 12 includes a table or base 61, which may be an extension of table 11. A partial housing 60 includes a vertical wall 64 and a top plate extending parallel to base 61. The ends of this partial housing as well as the side opening toward the stacker are open. Base 61 is provided with a longitudinal slot 66. A plurality of conveyor paddles 67, each of which carries a cross arm 68 extending substantially the width of base 61, are carried by a chain 69 over sprockets 70 in a counter-clockwise direction as viewed in Figure 3, to periodically project one or more stacks 72 longitudinally of base 61 and into a box 75, which is positioned with cover flaps 76 open, and having the bottom portion thereof held against a stop member 77. During operation the boxes are manually positioned, and removed after the packing operation.

As heretofore mentioned, the boxer conveyor chain 69 is driven from the common reduction unit 51 and is synchronized to effect the boxing operation immediately after the partial housing 60 has been filled. Paddles 67 travel at a speed whereby the boxing operation is complete before a successive stack of articles is projected into the housing 60. For purpose of illustration only, the drawing shows a boxer housing which is adapted to have three stacks of articles packed therein before the boxing operation is initiated, but it is apparent that the apparatus may be altered to provide the particular type of boxing which is desired.

Paddles 67 are similar in construction to paddles 36 heretofore described. They are provided with bifurcated offset portions 80 which are tiltably mounted to straddle chain 69 by means of pintles 81. A guide member 82, provided with arcuate termini, is provided as shown, and it is apparent that said paddles will be maintained in a vertical position during their travel through the top portion of the path transcribed by chain 69 and will tilt after the packing operation is complete and they arrive at the left hand end of guide 82, Figure 3, to be drawn through the space intermediate that end of guide 82 and the adjacent end of slot 66. During their passage back to the other end of guide 82 they will remain in a depending position, but will be returned to a vertical position upon contact with the arcuate right hand end portion of the guide and before a subsequent boxing operation is initiated.

Throughout the above description the various conveyor mechanisms have been described as including chains and sprockets. While I prefer this construction, it is apparent that the device would operate by the employment of belts and pulleys in place of chains and sprockets, or by any other suitable conveyor means so long as said conveyors may be designed to remain synchronized. The delivery conveyor, while herein described as carrying lugs 14, obviously could be of the lugless type, if described.

As shown in the drawing, the pair of infeeding chains 13 are less widely spaced than the transverse dimensions of the articles which they receive and the pairs of arms 31 of the stacking conveyor are more widely spaced than the vertical dimensions of the articles 17. The outfeeding chains 37 are more widely spaced than either the infeeding chains 13 or the chains 30 of the stacking conveyor, although the distance between the chains 37 is less than the transverse dimensions of the articles. Therefore, as shown in Figure 2, the receiving end portions of the chains 37, with their respective pusher arms 36, may pass around the sprockets 26 on the shaft 20 in positions flanking the stacking conveyor.

The chains 37 and their pusher arms 36 being outside of the field of movement of the stacking conveyor, there can be no interference with the operation of that conveyor, and both conveyors may be kept in continuous motion, it being unnecessary to bring the stacking conveyor to rest while any given pair of pusher arms is pushing a plurality of superposed articles from their respective supporting arms 31 of the stacking conveyor.

It will be observed, in Figure 1, that the articles carried by the stacking conveyor are shifted by gravity from set of arms 31 to the preceding set while the articles are being carried over the upper sprocket wheel 24. Therefore, this shift to the arms which must support the articles on the descending side or run of the conveyor is accomplished while the articles are being held by gravity in contact with the conveyor chains, and there is no tendency for the articles to slide outwardly on their respective sets of supporting arms.

I claim:

1. In apparatus of the character described, the combination with a horizontally disposed conveyor table, of a conveyor operating adjacent one margin thereof in a vertical plane to move articles in spaced relation toward the table, a second conveyor operative horizontally across the line of article movement to push a plurality of such articles from the first mentioned conveyor to and across said table in the form of a stack, said second conveyor being sufficiently offset from the first conveyor to allow the conveyors to operate in intersecting planes, and means for operating said conveyors continuously and in synchronism.

2. In apparatus for stacking and boxing articles, the combination with an endless conveyor adapted to lower articles in a vertical path toward a horizontally disposed conveyor table, of a second endless conveyor operating in paths laterally offset from those traversed by the first conveyor and intersecting the path of the articles carried by the first conveyor, spaced pusher arms carried by the second conveyor for the periodic removal of a predetermined number of articles horizontally from the first mentioned conveyor to form and remove stacks of articles in succession, and means for operating said conveyors continuously.

3. In a device of the character described, the combination with a conveyor having an upright flight and a series of arms projecting therefrom and adapted to support individual work pieces, of a table contiguous to which said arms move upon said conveyor flight, a pair of spaced chains adapted to receive said arms between them and upright paddles carried in corresponding positions by their respective chains and having a height sufficient to sweep work pieces from a series of said arms on to said table whereby to stack said work pieces upon the table for propulsion as a stack across the table before such paddles.

4. The combination with first and second conveyors having respective flights angularly disposed to move upon intersecting paths, of a series of spaced arms on the first conveyor adapted to receive successive work pieces, means for advancing said first conveyor in a direction to move successive work pieces on said arms toward the second conveyor, propelling arms spaced upon said second conveyor, said arms being offset to clear each other in the movement of the respective flights of the respective conveyors at the point of intersection of their respective paths, and means for actuating the second conveyor in a direction to advance its arms successively from the projecting arms of the first conveyor, the arms of the second conveyor being sufficiently long to intercept a plurality of work pieces carried by successive arms of the first conveyor and to sweep such work pieces from succesive arms into a stack for further propulsion by the second conveyor, said second conveyor actuating means being operable at a rate synchronized with the rate of operation of the first conveyor to stack the work pieces carried by a predetermined number of arms of the first conveyor as such work pieces approach the second conveyor.

5. In a device of the character described, the combination with two endless conveyors having a common driving shaft about which they are operable and having runs disposed in angularly related and mutually intersecting planes, said runs being offset to clear each other at the point where such planes intersect, work supports in relatively closely spaced relation upon the runs of one of said conveyors and movable therewith toward the intersecting run of the second conveyor, and work propelling means spaced upon the run of the second conveyor and offset from said supports for clearance, said propelling means having sufficient length to sweep a series of work pieces from successive supports of the first conveyor and to continue the propulsion of such work pieces as a stack, said conveyors being adapted for continuous stack forming operations.

6. In a machine of the described class, a stacking and propelling device comprising the combination with stacking and outfeeding conveyors, of a series of arms constituting work supports projecting from the stacking conveyor, work propelling arms on the outfeeding conveyor, said conveyors being angularly disposed with respect to each other and having their respective runs so associated that each of the work propelling arms of the outfeeding conveyor moves transversely across the path of a plurality of work pieces respectively carried by the work supports of the stacking conveyor, means for operating the stacking conveyor in a direction such that its work supports advance work pieces toward the outfeeding conveyor, and means for continuously operating the outfeeding conveyor at a rate such that as successive work pieces on said supports approach the outfeeding conveyor a propelling arm thereof will sweep a plurality of work pieces from successive supports of the stacking conveyor and advance such work pieces as a stack away from the point of delivery from the stacking conveyor.

7. In a stacking and boxing machine, the combination of a stacking conveyor, a stack receiving and outfeeding table provided with slots extending outwardly from the stack forming side of said conveyor, an endless outfeeding conveyor extending across the plane of the stack forming side of the stacking conveyor and underneath the table along lines parallel with the table slots, and pusher arms carried by the outfeeding conveyor in line with the table slots in operative relation to stacks of articles on the table.

8. In a machine of the described class, a stacking conveyor of the endless belt type, operable in a vertical plane and provided with outwardly projecting article supporting arms, means for feeding articles between said arms on the ascending side, a driving shaft for the lower end of said conveyor, and an outfeeding conveyor having portions laterally offset from the downwardly moving side of the stacking conveyor and driven from said shaft, pusher arms carried by the outfeeding conveyor across the path of descending articles presented to the pusher arms by the stacking conveyor, and means for driving said conveyors continuously.

9. In a machine for boxing groups of stacks of articles, the combination with a stacking table and means for assembling individual articles in stacks upon such table, of a boxing table at the end of the stacking table adapted to receive a plurality of stacks, a conveyor movable along the stacking table having spaced stack propelling means, said conveyor being arranged to deliver successive stacks onto said boxing table, a cross conveyor operating transversely with respect to the conveyor first mentioned and across said boxing table, and a box support next to said boxing table and located to support a box to receive a group of stacks from the boxing table, said cross conveyor being provided with means for actuating a group of stacks of articles from said boxing table into a box on said support, said cross conveyor and the conveyor first mentioned having driving connections synchronized for the operation of the cross conveyor when a predetermined number of stacks has accumulated on the boxing table.

10. In a machine for accumulating individual articles in stacks and accumulating stacks of such articles in groups for boxing, the combination with an infeeding conveyor for delivering a succession of articles to be stacked, of a second conveyor operable transversely across the path of the conveyor first mentioned and provided with a succession of article receiving and propelling means to successively receive articles from the first conveyor, a stacking table past which said second conveyor operates, and a stacking conveyor comprising means movable along said table transversely with respect to the path of movement of the second conveyor and of such position and length as to sweep groups of successive articles from the receiving and propelling means of the second conveyor onto and across the stacking table in stacks, said means being offset laterally with respect to the second conveyor and the article receiving and propelling means thereof, whereby to engage and remove a group of successive articles from the second conveyor during the continued movement thereof, together with means for continuous actuation of the several conveyors.

11. In a machine of the character described having infeeding and stack receiving tables arranged in sequence, the combination therewith of a first conveyor of the endless belt type operable in a vertical plane between the infeeding and stack receiving tables, with its ascending run in receiving relation to the infeeding table and its descending run in outfeeding relation to the stack receiving table, said first conveyor having outwardly projecting article supporting members spaced from each other at greater distances than the vertical dimensions of the articles to be stacked, means for singly pushing articles from the infeeding table between successive supporting members, an endless outfeeding conveyor operating along the stack receiving table and extending across the plane of the descending run of the first conveyor in laterally offset relation thereto, spaced pusher arms on the outfeeding conveyor of such length and location as to sweep a series of articles simultaneously from the first conveyor to and across the stack receiving table as a stack, and power driven means for actuating said conveyors continuously.

12. In a continuously operable stacking and boxing machine, the combination of an endless stacking conveyor operative in a vertical plane and provided with outwardly extending article supporting arms, means for mechanically feeding individual articles between successive supporting arms on the ascending side of said conveyor, a receiving table in proximity to the outer ends of said arms on the descending side of said conveyor, an outfeeding endless conveyor associated with the receiving table and operative in a horizontal plane, a common driving shaft about which both conveyors extend in mutually offset relation to each other, pusher arms carried by the outfeeding conveyor in sufficiently spaced relation to each other to periodically engage and push a plurality of articles from the descending supporting arms of said first conveyor across the table in stacked relation to each other, a stack assembly table at the delivery end of said receiving table and of dimensions to receive a plurality of stacks from the outfeeding conveyor, a box support at one side of said stack assembly table, an endless cross conveyor synchronized to the outfeeding conveyor to push successive groups of stacks into boxes successively placed on the box support, and power driven means for operating said conveyors continuously in synchronism as aforesaid.

13. A stacking and boxing machine, comprising the combination of a series of conveyors of the endless belt type, including a horizontally operating infeeding conveyor, a vertically operating stacking conveyor having an upwardly operating run in receiving relation to the infeeding conveyor, and a descending run whereby to lift, invert and superpose articles received from the infeeding conveyor, an outfeeding conveyor including work propelling arms operating across the descending run aforesaid to remove superposed articles in stacks from the descending run of the stacking conveyor, a boxing table to which said outfeeding conveyor delivers successive stacks of articles, and a boxing convyeor extending transversely across the boxing table at the delivery end of the outfeeding conveyor, said outfeeding and boxing conveyors being provided with spaced stack pushing devices mounted for relative movement upon their respective conveyors between operative and retracted positions and provided with means for releasing them for retraction from the stacked articles at the delivery ends of such conveyors, means for supporting boxes at the delivery end of the boxing conveyor in a position to receive successive groups of upright stacks of articles, and means for continuously operating all of said conveyors in synchronism for continuous stacking of articles, assembly of stacks in groups, and packaging of groups of stacks of such articles.

14. In a stacking and boxing machine, the combination with a stacking table, of means for continuously superposing on the table articles to be boxed, a conveyor continuously operable along the table and having pusher arms, means mounting the arms for retraction with respect to the conveyor, means holding said arms in position to move superposed articles across the table in the form of stacks of predetermined height, a stack receiving housing in the line of conveyor movement positioned at the end of the table and of such size as to receive from the table a plurality of stacks, said arm holding means having a terminal portion for releasing said pusher arms for automatic retraction from successive stacks delivered to said housing, a box support laterally offset from the housing, and means for periodically pushing a plurality of stacks from said housing into a box on the box support.

15. In a machine of the described class, the combination with a box support and a boxing table having an open side and a closed side and open ends, one of said ends opening toward said box support for delivery of material into a box on said support, said table being of a size to receive a plurality of stacks of articles for delivery to the box on said support, a boxing conveyor operating across the table toward the box support and comprising means for propelling into the box on said support a plurality of stacks of articles from the boxing table, and a continuously operable endless feeding conveyor comprising a work support leading to the open side of the boxing table and propelling means spaced for the advance of individual stacks of articles along the work support toward the open side of the boxing table, together with driving connections for said propelling means and said boxing conveyor for the synchronous and continuous operation thereof at a rate such that stacks of articles on the boxing table are advanced into the box on said support only when a plurality of stacks have been delivered successively to the boxing table by said propelling means.

16. In a machine for boxing groups of stacks of articles, the combination with a stacking table, a boxing table at one end thereof and a box support laterally adjacent the boxing table, said boxing table being adapted to receive a plurality of stacks, of a conveyor movable along the stacking table toward the boxing table, work propelling means mounted on said conveyor and positioned to engage work on the stacking table for the propulsion thereof toward the boxing table, supports for said work propelling means upon which said means are individually retractible with respect to said conveyor from work propelling position, means for holding the work propelling means in work propelling position during the work propelling movement of said means along the stacking table, said work propelling means being releasable from work propelling position upon delivering stacks to the boxing table, and a cross conveyor provided with driving connections synchronized with the conveyor first mentioned and operable transversely of the boxing table for propelling into a box on said support a predetermined number of stacks of articles accumulated on said boxing table.

17. In a machine of the described class, a first conveyor operable in a vertical plane and provided with outwardly projecting article supporting arms, means for continuously operating said first conveyor, means for feeding onto successive arms articles for support thereby, an outfeeding conveyor having portions extending transversely with respect to the path of movement of the first conveyor and laterally offset therefrom for article actuation during continued movement of the first conveyor, article propelling means carried by the outfeeding conveyor for movement across the path of articles supported by the arms of the first stacking conveyor, said article propelling means being substantially concurrently engageable with articles supported on a plurality of successive arms of the first stacking conveyor and being movable in a direction to discharge such articles from said supporting arms in a stack, and a work supporting surface arranged to receive the stack of articles so discharged and leading away from the first stacking conveyor for the continued propulsion of the stack from said first stacking conveyor by said propelling means.

18. The combination with an endless first conveyor having laterally projecting arms spaced for the support of individual articles to be stacked, a shaft adjacent one end of the conveyor provided with pulley means over which said conveyor is operable, a second conveyor having pulley means on the same axis as the shaft aforesaid, said conveyors having runs disposed transversely with respect to each other and in laterally offset planes whereby a run of the second conveyor passing about its pulley means crosses a run of the first conveyor, and propelling means carried by the second conveyor and positioned to move in the operation of the second conveyor about said pulley means into engagement with a plurality of articles carried on separate arms of the first conveyor in a direction to sweep such articles from said arms into a stack propelled by the second conveyor.

19. A machine for packaging in one box a plurality of stacks of articles delivered singly to the machine, said machine comprising the combination of a stacking conveyor having a run provided with laterally projecting arms, an infeeding conveyor leading to the stacking conveyor and arranged to deliver successive articles between successive arms, an out-feeding conveyor having a run movable transversely of the aforesaid run of the stacking conveyor and in a direction to discharge articles from the arms of the stacking conveyor, said last mentioned conveyor comprising a support for articles discharged and propelling means engageable with the articles on a series of arms of the stacking conveyor whereby to propel all of such articles substantially simultaneously from the stacking conveyor and to continue the propulsion thereof as a stack, a boxing table toward which said outfeeding conveyor operates, said boxing table having a capacity sufficient to receive a plurality of stacks of articles from said outfeeding conveyor, a box support laterally adjacent the boxing table and so positioned as to hold a box to receive stacks of articles accumulated on said table, and a boxing conveyor movable along the boxing table transversely with respect to the path of movement of said outfeeding conveyor and comprising means for periodically sweeping into a box on said support a plurality of stacks of articles accumulated on the boxing table, and means for the synchronous operation of the several conveyors.

CURT G. JOA.